United States Patent [19]

Narain

[11] 4,236,918
[45] *Dec. 2, 1980

[54] RECOVERY OF ELEMENTAL SULFUR AND METAL VALUES FROM TAILINGS FROM COPPER RECOVERY PROCESSES

[75] Inventor: Kartik A. Narain, Tucson, Ariz.

[73] Assignee: Cyprus Metallurgical Processes Corporation, Los Angeles, Calif.

[*] Notice: The portion of the term of this patent subsequent to Feb. 6, 1995, has been disclaimed.

[21] Appl. No.: 4,808

[22] Filed: Jan. 15, 1979

Related U.S. Application Data

[63] Continuation-in-part of Ser. No. 894,515, Apr. 10, 1978, Pat. No. 4,138,248.

[51] Int. Cl.³ .................. C22B 15/10; C22B 11/08; C22B 34/34
[52] U.S. Cl. ........................ 75/101 R; 75/2; 75/104; 75/117; 75/118 R; 75/121; 423/26; 423/29; 423/38; 423/53; 423/567 A
[58] Field of Search ............... 75/101 R, 2, 104, 117, 75/118 R, 121; 423/26, 29, 38, 53, 567 A

[56] References Cited

U.S. PATENT DOCUMENTS

| | | | |
|---|---|---|---|
| 1,574,987 | 3/1926 | Marx | 423/571 |
| 3,785,944 | 1/1974 | Atwood et al. | 75/117 X |
| 3,798,026 | 3/1974 | Milner et al. | 75/104 |
| 3,879,272 | 4/1975 | Atwood et al. | 75/117 X |
| 3,972,711 | 8/1976 | Goens et al. | 75/117 |
| 4,013,457 | 3/1977 | Goens et al. | 75/104 |
| 4,039,324 | 8/1977 | Stephens et al. | 75/72 |
| 4,138,248 | 2/1979 | Narain | 75/117 X |

*Primary Examiner*—G. Ozaki
*Attorney, Agent, or Firm*—Sheridan, Ross, Fields & McIntosh

[57] ABSTRACT

Process for recovery of copper, molybdenum, gold and elemental sulfur in tailings from hydrometallurgical processing of copper sulfide ores, particularly chalcopyrite. The tailings are usually discarded, and thus the recovery of valuable elements therefrom makes the environmentally desirable hydrometallurgical processes of FIG. 1 economically feasible.

The tailings are concentrated to a small bulk volume by froth flotation to reject barren gangue and the process (FIG. 2) proceeds by removing sulfur from the solid concentrate residue, preferably by volatilization or leaching with a sulfur solvent, and recovering the elemental sulfur; leaching the residue with ferric chloride to selectively dissolve copper and iron: recovering copper from the liquid, or sending it back to the hydrometallurgical circuit; leaching the residue from the ferric chloride leach with cyanide to selectively solubilize gold, and recovering gold from the liquid, recovering molybdenum ore from the residue from the cyanide leach by froth flotation, and recovering molybdenum from the molybdenum ore.

41 Claims, 2 Drawing Figures

RECOVERY OF ELEMENTAL SULFUR AND METAL VALUES FROM TAILINGS FROM COPPER RECOVERY PROCESSES

DESCRIPTION

CROSS REFERENCE TO RELATED APPLICATIONS

This application is a continuation-in-part of my application Ser. No. 894,515 filed April 10, 1978 which is U.S. Pat. No. 4,138,248.

TECHNICAL FIELD

The invention is related to hydrometallurgical processes for the recovery of copper from its ores, particularly, sulfide ores, in which the ore concentrate is leached with ferric chloride and/or cupric chloride to solubilize the copper as the chloride and produce elemental sulfur.

BACKGROUND ART

The basic process upon which the process of the present invention comprises an improvement, is illustrated by those described in U.S. Pat. Nos. 3,785,944; 3,798,026; 3,879,272; 3,972,711; 4,013,457; 4,039,324. The disclosure of some of these patents includes chemical equations illustrating the reactions occurring when chalcopyrite is leached with ferric chloride and cupric chloride to solubilize the copper and produce elemental sulfur. Some of the patents further describe how copper is recovered from the formed cuprous chloride by crystalization followed by recovery of copper from the crystallized cuprous chloride. The prior art discloses various other methods for the recovery of copper from the leach solution resulting from the leaching of copper ores and concentrates with ferric chloride and/or cupric chloride.

INDUSTRIAL APPLICABILITY

Copper sulfide ores, in particular, contain materials which are soluble in ferric chloride and cupric chloride leachants and are usually discarded in the tails from hydrometallurgical leaching with these leachants. These materials may include valuable substances, such as, the elemental sulfur formed in the leaching reactions as well as gold and molybdenum values. They also may contain impurity-like materials, such as pyrite, jarosite and others. If the pyrite contains gold it is not rejected in the flotation step. Some of the copper sulfide mineral which is embedded in the mineral grains is not dissolved by the leachant as the leachant does not come into direct contact with the copper mineral, and this undissolved mineral is contained in the tailings.

As the processes for recovery of copper from its sulfide ores which are acceptable under environmental regulations are quite competitive, it is important from an economic standpoint to have available effective procedures which are compatible with the copper recovery processes for recovering saleable elemental sulfur and metal values from the tailings. Such a process should be one that is adaptable to pilot plant production in a continuous operation and no such process is known to be available today. A major difficulty has been that the relatively small amounts of metal values in the ore other than copper have been contained in large bulk volumes of gangue after concentrating the copper ore and it was not possible to economically process this large bulk of material to recover the relatively small amounts of metal values. This was particularly true in prior processes in which sulfur was removed from the ore by pyrometallurgical processes. Difficulty has been encountered in separating elemental sulfur in the presence of copper and molybdenum in the concentrates. A further difficulty has been encountered in recovering molybdenum in the presence of copper which is not contaminated by the copper to the point where the molybdenum is unsaleable, and at the same time achieve high recovery of molybdenum. Any molybdenum left in the tails ordinarily could not be recovered. If gold is present it will also contaminate the molybdenum.

Accordingly it is the object of this invention to provide a process for the recovery from tailings resulting from the hydrometallurgical processing of copper ores, of elemental sulfur, copper, gold and molybdenum in one continous operation in which the tailings from which the sulfur and metal values are recovered are first reduced to a relatively small bulk volume.

It is another object of this invention to provide a process for the recovery of a higher percentage of the copper from the tailings resulting from the hydrometallurgical processing of copper sulfide ores.

It is a further object of this invention to provide a process for the recovery from tailings from the hydrometallurgical processing of copper sulfide ores, of molybdenum which is not contaminated with copper, or gold, if present, to the extent that the molybdenum does not meet the purity standards for a saleable product.

DISCLOSURE OF INVENTION

A process for the recovery from tailings from the hydrometallurgical treatment of copper ores, of elemental sulfur, copper, gold and molybdenum in which sulfur and the metals are selectively separated in a required sequence with specific reagents which comprises (a) subjecting the tailings to froth flotation to recover elemental sulfur, copper, gold and molybdenum values in a float concentrate containing a relatively small portion of the original tailings and rejecting a relatively large portion of the tailings containing barren gangue; (b) performing a liquid-solids separation on the float concentrate; (c) removing elemental sulfur from the residue of step (b), preferably by (1) leaching the residue of step (b) with a solvent for sulfur, performing a liquid-solids separation on the slurry, and recovering sulfur from the liquid, or (2) volatilizing the sulfur from the residue of step (b) and recovering elemental sulfur from the vapor; (d) grinding the residue of step (c) to expose the copper minerals; (e) leaching the ground residue of step (d) with ferric chloride to selectively dissolve copper and iron therein; (f) performing a liquid-solid separation on the slurry of step (e); (g) returning the filtrate of step (f) containing solubilized copper to the original leach for copper recovery; (h) leaching the residue of step (f) with cyanide to solubilize gold and recovering gold from the resulting solution; (i) subjecting the residue of step (h) to froth flotation and recovering the float concentrate containing molybdenum values and elemental sulfur formed in the ferric chloride leach; (j) removing sulfur from the float concentrate of step (i) by (1) leaching with a solvent for sulfur to solubilize the elemental sulfur followed by liquid-solids separation and recovery of sulfur from the solution, or (2) volatilizing sulfur from the concentrate and recovering elemental sulfur from the vapor, and (k) recovering molybdenum from the residue of step (j).

The tails will ordinarily contain pyrite. If gold is present with the pyrite the pyrite is not rejected with the barren gangue. Of course, if there is no gold present the gold recovery step is omitted. Jarosite will be present in the barren gangue unless it was optionally removed as shown in the flow sheet of FIG. 1. The sulfur removal step after gold recovery is mainly for the purpose of upgrading the product molybdenum for marketing. It is optional depending upon the amount of copper sulfide reporting to the tails and, therefore, the amount of sulfur produced by the ferric chloride leach.

DETAILED DESCRIPTION OF THE PREFERRED EMBODIMENTS

The invention will now be described with reference to the accompanying drawings and the illustrative examples which follow.

The results set forth in the examples below were obtained on the tailings resulting from the hydrometallurgical processing of chalcopyrite for the recovery of copper, however, the process is not limited to these particular tailings as it is applicable to tailings obtained from the hydrometallurgical treatment of other copper sulfide ores. The process is not limited in its application to tailings alone as it obviously can be used on ore concentrates generally. The term "tailings" as used herein includes concentrates.

Figure 1:
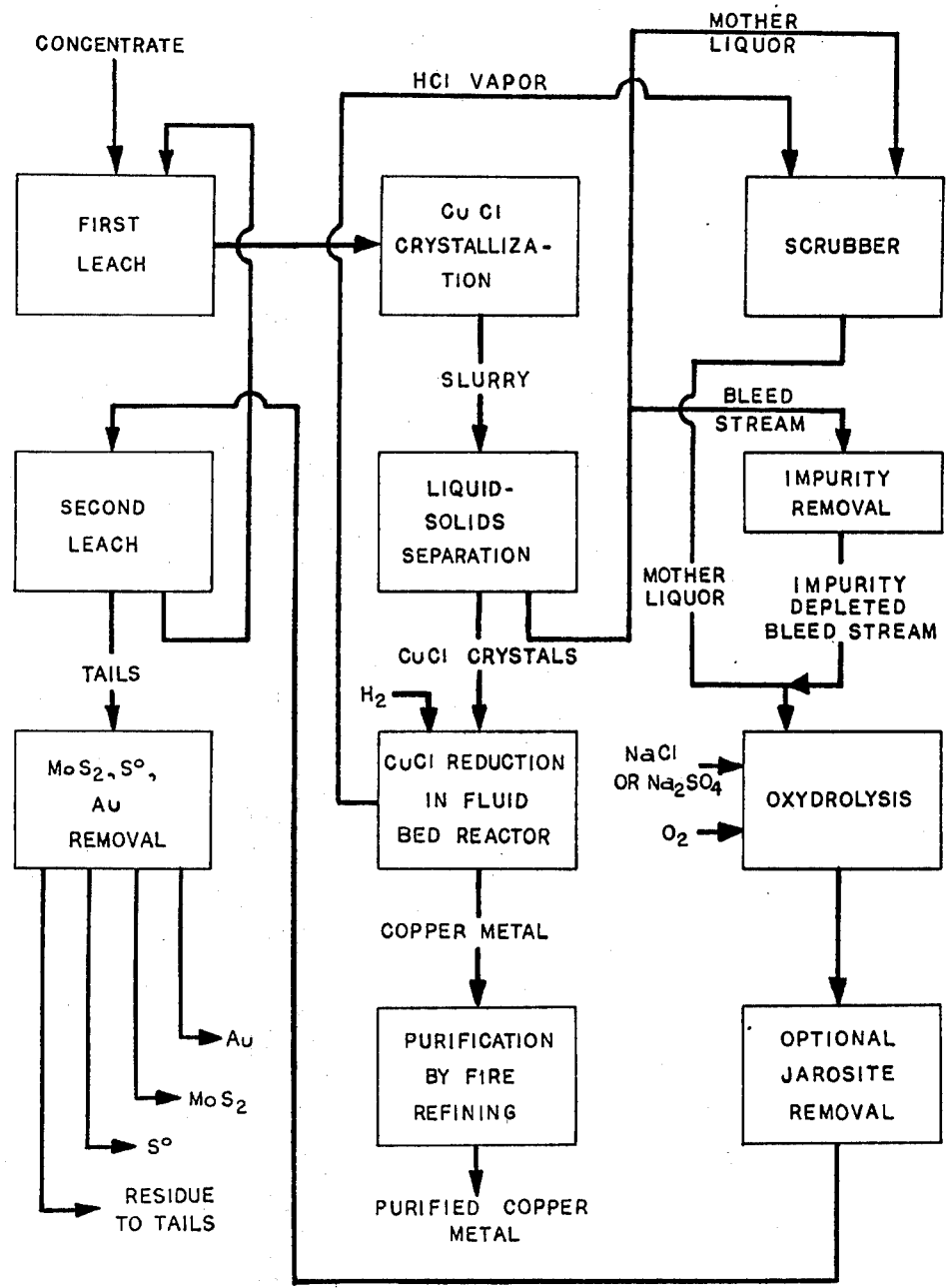
FIG. 1 is a flow sheet of a process for the hydrometallurgical recovery of copper incorporating the process of the present invention.

Referring to FIG. 1, it is seen that the chalcopyrite concentrate is subjected to two leaches resulting in the tails which contain some unsolubilized copper, gold, molybdenite, elemental sulfur, and other undissolved materials which latter make up the bulk of the tails and are rejected in the flotation step. The copper will be contained in undissolved chalcopyrite not contacted by the leaching agent.

The leaching illustrated in the flow sheet was performed with ferric chloride and cupric chloride and follows the procedure set forth in some of the above-referred-to patents. Briefly, the process comprises leaching copper sulfide ores and concentrates with ferric chloride and/or cupric chloride to produce a leach solution comprising cuprous chloride, cupric chloride, ferrous chloride, soluble metal impurities, and insoluble materials which latter go to the tailings, separating by crystallization at least a portion of the cuprous chloride in the leach solution resulting in cuprous chloride crystals and a mother liquor, separating the cuprous chloride crystals from the mother liquor, reducing the crystallized cuprous chloride to product copper, controlling the impurity level of the mother liquor with the use of a bleed stream, subjecting the resulting mother liquor to oxydrolysis with oxygen to regenerate the leachants, cupric chloride and ferric chloride and precipitate iron, filtering, and returning the filtrate to the second leach. Jarosite may optionally be removed from the filtrate as shown.

Obviously, the application of the process of the invention is not restricted to tails resulting from the above or any other specific procedure for the recovery of copper from sulfide ores.

The composition of the tails from chalcopyrite leaching as described above presents a special problem in that the tails contain elemental sulfur which must be removed first to prevent its interference with the recovery of copper, gold and molybdenum. The copper contained in the tails will contaminate the molybdenum if not effectively removed before molybdenum recovery. Gold must also be removed before molybdenum recovery or it will contaminate the molybdenum. As copper is soluble in sodium cyanide the copper removal step must precede the gold removal step. Accordingly, it will be seen that the order of steps performed with the reagents used is critical for the production of substantially pure gold and molybdenum products. The present process is a cooperative adjunct to processes like those disclosed in the above-mentioned patents because it provides for recovery of copper which would otherwise be lost from the tails, and which is removed from the tails in a solution which is compatible with the main leach circuit for recovery of copper to which the solution is returned. Also, the process of the patents produces elemental sulfur and the present process is directed to recovery of this element from tails where it exists with copper, gold, and molybdenum.

Reference will now be made to the Figures in describing the process of the invention. As will be seen, tailings from the second leaching step of the original or main chalcopyrite leach containing pyrite and possibly jarosite are subjected to flotation. As shown in FIG. 1, jarosite may optionally be removed from the recycle stream from the oxydrolysis before it is returned to second leach. The flotation is a pre-concentration stage which is used to reduce the bulk of the tailings to be processed for the recovery of elemental sulfur and metal values. The flotation circuit consists of two stages of flotation with the use of conventional flotation agents whereby the barren gangue including any jarosite present and most of the pyrite is rejected provided the latter does not contain gold. The float concentrates was found to constitute only 27.5 percent by weight of the tailings and consistently contained 93 percent of the copper, 84 percent of the molybdenum and 99 percent of the sulfur in the tails. This substantial reduction in tailings to be processed for the recovery of elemental sulfur and metal values is a very advantageous result of the invention from an economic standpoint. The rejected iron bearing compounds may be either acidified to produce a material suitable as a soil nutrient or disposed of as waste material. The process is operative without this flotation step but would obviously be more expensive because of the additional material which would have to be handled.

The elemental sulfur is next recovered from the float concentrate. The order of performance of this step is important because of elemental sulfur is present during the recovery steps for copper, gold and molybdenum it will cause serious problems from a physical standpoint.

In one embodiment of the invention, the float concentrate is filtered to remove water and the residue leached for fifteen minutes preferably with ammonium sulfide to form ammonium polysulfide in accordance with the following reaction:

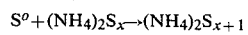

$S^o + (NH_4)_2S_x \rightarrow (NH_4)_2S_{x+1}$

Preferred ammonium sulfide requirements appear to be about one pound of ammonium sulfide per pound of sulfur. The pulp is leached, filtered and washed thoroughly. The filtrate is then sent to an evaporator where ammonium polysulfide is decomposed according to the following equation by heating at 95° C.:

$$(NH_4)_2S_{x+1} \xrightarrow{Heat} H_2S + 2NH_3 + x\,S^o.$$

This temperature is not critical. Sulfur is crystallized out and ammonium sulfide is regenerated by scrubbing the gases given off with water and sent back to the ammonium sulfide treatment step. Because of this regeneration of ammonium sulfide, the net ammonium sulfide loss in the process is less than about five percent. The sulfur precipitate consists of pure (99.8 percent) rhombic crystals, the major impurity being iron.

Other solvents than ammonium sulfide may be used for the dissolution of sulfur, such as, sodium sulfide, perchloroethylene and carbon disulfide. Of course, ammonium sulfide is the preferred solvent as it can be regenerated for reuse.

In another embodiment of the invention, the float concentrate is heated to volatilize the sulfur. The volatilization temperature is not critical, but from a practical consideration it is preferably such that the sulfur is removed within a reasonable time. Preferable temperature ranges are between 300° and 600° C., with the most preferred range being 400°-500° C. As sulfur is capable of spontaneous combustion above 400° C., the reaction should be performed in an inert atmosphere, such as nitrogen. This inert atmosphere provides a medium for purging the sulfur from the volatilization chamber for condensation and recovery. The reaction can be performed in a partial vacuum, preferably varying from about 10 to about 25 inches of mercury, which conditions facilitate the time and temperature requirements.

Since approximately two percent of the copper fed to the leach circuit as chalcopyrite remains in the tails because it has not been contacted with the leachant, it is important from an economic standpoint to recover the copper values in the tailings from which elemental sulfur has been separated. The order of performance of this step is important because unless copper is removed before molybdenum is recovered the copper will contaminate the molybdenum to the point where it is not saleable for important commercial usages, such as, alloying with steel. Copper must be removed before the gold recovery step as it is soluble in sodium cyanide, the solvent used for gold recovery.

The residue from the sulfur removal step amounts to only about six percent of the total weight of the tailings, further illustrating the effectiveness of the invention in reducing the amount of tailings which must be processed for recovery of the metal values. The residue is ground to about 95 percent being −325 mesh in a ball mill closed circuit with a cyclone to expose substantially all of the remaining copper ore concentrate. The ground solids are then subjected to ferric chloride leach for about three hours at 105° C., after which the pulp is filtered and the filtrate containing the solubilized copper and iron as chlorides is sent back to the main hydrometallurgical leach circuit. The ferric chloride leaching temperature used is not critical.

Figure 2:
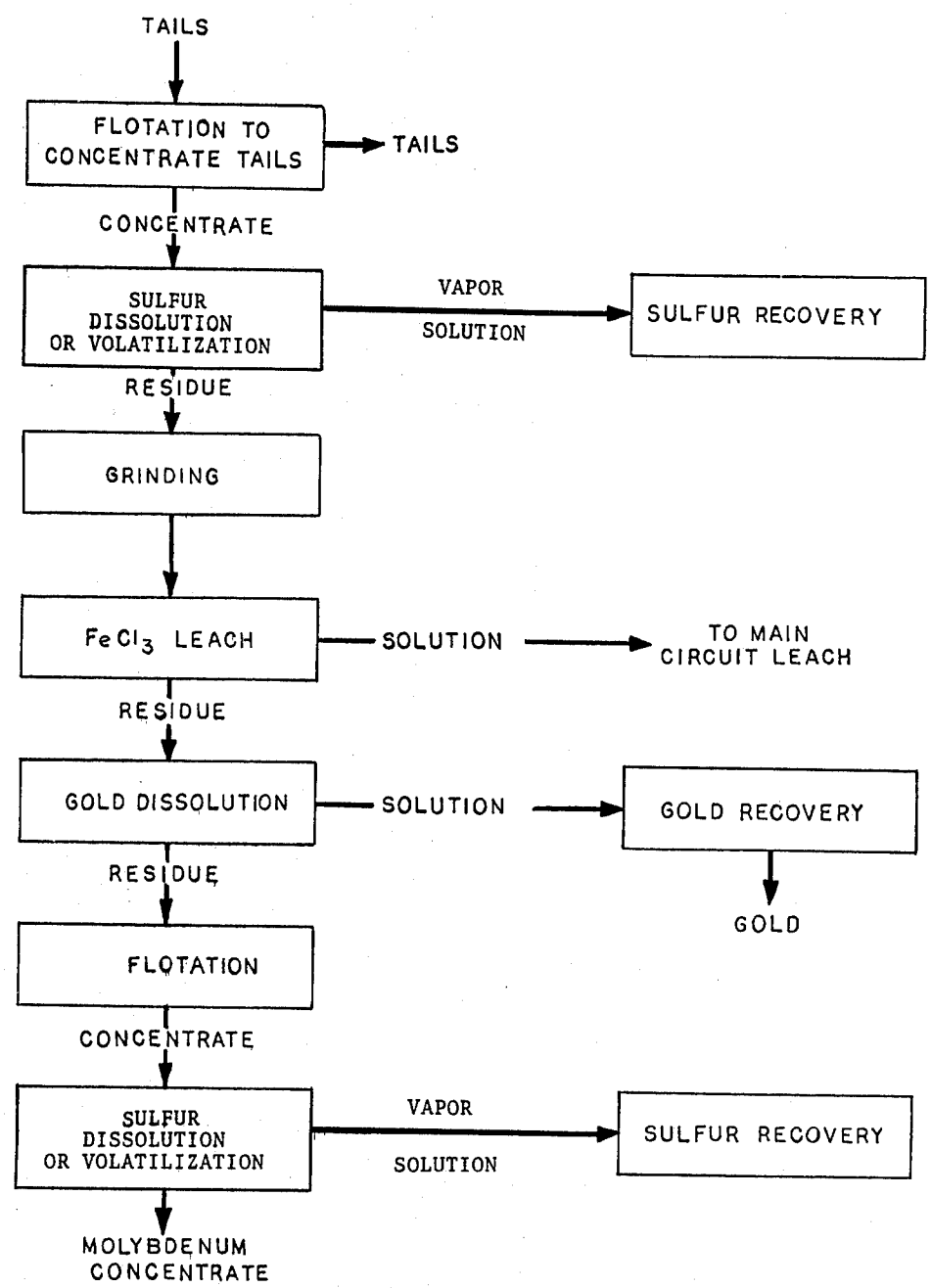
FIG. 2 is a flow sheet of the process of the invention as applied to tailings resulting from the ore leaching step in hydrometallurgical processes like that illustrated in FIG. 1.

As the flow sheet of FIG. 2 indicates, gold, if present, is next recovered. The residue from the ferric chloride leach is leached with sodium cyanide as is conventional for the selective solubilization of the gold from the molybdenum and a liquid-solids separation performed on the resulting slurry. The gold is recovered from its cyanide solution by conventional techniques. Other cyanides may be used for solubilizing gold, such as, some of the other alkali metal cyanides; however, sodium cyanide is preferred for economic reasons.

Molybdenum is next recovered as shown in the flow sheet. The residue from the cyanide leach is filtered and washed. Wash water, being very small in quantity, is recycled to the cyanide leach. The residue is repulped and cleaned three times. The recleaned concentrate from this float circuit is again leached with ammonium sulfide to remove elemental sulfur formed in the ferric chloride leach, and sulfur recovered and ammonium sulfide regenerated as explained above. The water washed residue from which elemental sulfur, gold, and copper have been removed contains 50–70 percent of the original molybdenum in the concentrate and assays 25–45 percent molybdenum and one percent copper. Molybdenum can be recovered from the residue by known procedures.

Tests have shown that procedures based on the above-described flow sheet results in recovery from the tailings of up to 90 percent copper, 50 percent molybdenum (80 percent recovery predicted by recycling), and over 95 percent of the elemental sulfur.

The process is illustrated by the following example in which the procedure outlined in the flow sheet of FIG. 2 was followed. The sample used contained no appreciable amount of gold.

EXAMPLE 1

The tails had the following assayed composition:
Cu—0.52%
Mo—0.21%
$S^o$—21.0%

The tails were subjected to two flotation steps using as flotation agents calcium oxide, sodium silicate and sodium cyanide. After flotation and elimination of the rejected residue or tails from the flotation concentrate, the latter had the following assayed composition:
Cu—1.76%
Mo—0.65%
$S^o$—76.3%

The discarded tails or residue from the flotation had the following assayed composition:
Cu—0.060%
Mo—0.058%
$S^o$—0%

After filtering the float concentrate, the residue was leached with 45 percent ammonium sulfide solution using about one pound of ammonium sulfide per pound of sulfur to solubilize the elemental sulfur and form ammonium polysulfide. The formed slurry was filtered and the filtrate evaporated at 90° C. for two hours to crystallize out sulfur. The gases were scrubbed with water to recover ammonium sulfide which was recycled to the ammonium sulfide leaching step. The recovered sulfur crystals assayed 99.8 percent sulfur; 98 percent of the original elemental sulfur was recovered.

The residue from the ammonium sulfide leach was ground in a ball mill until 95 percent of the solids were about −325 mesh. The ground residue was leached with concentrated ferric chloride for three hours at 105° C. and the formed slurry filtered. The filtrate was sent back to the main leach. It had the following assay:
Cu—0.23%

Mo—2.87%
S°—21.06%
indicating that 90.3 percent of the total copper in the tails had been dissolved and sent back to the main leach for recovery.

The residue from the ferric chloride leach was again subjected to flotation with the same flotation as used above. The float concentrate was recovered and found by assay to have the following composition:
Cu—0.48%
Mo—7.11%
S°—72.05%
The elemental sulfur was formed in the ferric chloride leach, and it is necessary to remove it before recovering molybdenum. The elemental sulfur was removed by the ammonium sulfide treatment, recovered by the procedure described above, and ammonium sulfide regenerated and returned to the ammonium sulfide leaching step. After a liquid-solids separation the residue was thoroughly washed and recleaned and had the following assayed percentage composition:
Cu—1.64%
Mo—24.4%
S°—2.5%
50.4 percent of the molybdenum in the original tails was recovered. Molybdenum having the required purity for alloying with steel is recovered from the concentrate.

EXAMPLE 2

In order to illustrate the process applied to a gold containing concentrate the process was run on two concentrates containing gold, i.e., a "Magma" concentrate and an "Eldorado" concentrate and the results of the gold recovery step are given in the following tables:

TABLE 1

| Concentrate | Gold concentration after FeCl$_3$ and/or CuCl$_2$ main leach |
|---|---|
| Magma | 0.051 troy oz./ton |
| Eldorado | 0.933 troy oz./ton |

Gold distribution after cyanide leach was as follows:

TABLE 2

| | Gold Assay | Gold Distribution |
|---|---|---|
| Magma Concentrate | | |
| Filtrate | 0.48 ppm | 92% |
| Residue | 1.4 ppm | 8% |
| Eldorado Concentrate | | |
| Filtrate | 7.15 ppm | 93% |

TABLE 2-continued

| | Gold Assay | Gold Distribution |
|---|---|---|
| Residue | 22.5 ppm | 7% |

EXAMPLE 3

The following example shows the effectiveness of sulfur removal from the flotation concentrate by volatilization under varying conditions of temperature, pressure and time. The tests were run in a tube furnace with no turn-over of the solids, and the results are as shown in Table 3.

TABLE 3

(Head: 44% S°; 3.5% H$_2$O)

| | Wt. of Sample | Wt. of Residue | Net Wt. Loss | Time (Min.) | Temp. (C.°) | Pressure (in. Hg) | % Sulfur in Residue | % Sulfur Volatilized |
|---|---|---|---|---|---|---|---|---|
| 1. | 6.50 | — | — | 10 | 420 | Atmospheric | 1.9 | * |
| 2. | 6.50 | 3.41 | 3.09 | 5 | 420 | 10 | 2.8 | 96.6 |
| 3. | 6.50 | 3.21 | 3.29 | 5 | 420 | 15 | 1.2 | 98.65 |
| 4. | 6.50 | 3.36 | 3.14 | 5 | 420 | 22 | 5.8 | 93.18 |
| 5. | 6.50 | 3.20 | 3.30 | 10 | 420 | 10 | .20 | 99.7 |
| 6. | 6.50 | 3.16 | 3.34 | 10 | 420 | 15 | <0.1 | 99 |
| 7. | 6.50 | 2.73 | 3.77 | 10 | 420 | 24 | .33 | 99 |
| 8. | 6.50 | 3.14 | 3.36 | 10 | 450 | 10 | .34 | 99 |
| 9. | 6.50 | 3.08 | 3.42 | 10 | 450 | 15 | <0.1 | 99 |
| 10. | 6.50 | 3.43 | 3.07 | 10 | 450 | 24 | .29 | 99 |
| 11. | 6.50 | — | — | 10 | 475 | 10 | <0.1 | 99 |
| 12. | 6.50 | — | — | 10 | 475 | 15 | <0.1 | 99 |
| 13. | 6.50 | — | — | 10 | 475 | 24 | <0.1 | 99 |

* Test run without vacuum left S° at both ends of the tube furnace, making it difficult to handle the set-up The tests indicate that over 99% of the sulfur can be volatilized in 10 minutes under varying vacuums at temperatures between 400° and 500° C. It is thus evident that the volatilization process described provides an effective alternative to dissolution with ammonium sulfide or a similar reagent for removal of sulfur. This volatilization method may be incorporated into the process of the invention in its proper sequence after the initial froth flotation concentration, and/or again after the froth flotation step for concentration of molybdenum values.

From the above description it is seen that a process has been provided for recovering copper, gold, molybdenum and elemental sulfur from the tailings resulting from hydrometallurgical processing of copper sulfide ores. The process provides for processing the minimum amount of tailings. It can be adapted to continuous operation. The order of performance of the steps with the reagents is important in order to prevent the interference by elemental sulfur with the recovery of copper, gold, and molybdenum, and in order to provide for effective selection separation of the various metals so that contamination of recovered metals is prevented. The process is cooperatively related to the main copper ore leaching step because this latter step always produces elemental sulfur and because ferric chloride leach solution containing the copper recovered from the tails in the process of the invention is adaptable for introduction into the main copper ore leach step of the copper recovery process, thus making return of the leach solution to the main leaching step for recovery of copper feasible. The high percentage recoveries of sulfur, copper, molybdenum and gold obtained from the tails illustrates the economic effectiveness of the process.

An advantage of the process is that it eliminates the necessity of having a molybdenum flotation circuit in the mine concentrator as the process provides for recovery of the molybdenum which remains in the concentrate. It is well known that recovery of the molybdenum in the flotation circuit in the mine concentrator requires the recovery of molybdenum in the presence of copper at all copper mills and this is very difficult to do and results in losing a substantial portion of molybdenum values in meeting the copper content limit of the recovered molybdenum.

I claim:

1. In the process for recovering copper from copper sulfide concentrates in which the concentrate is leached in a main leach circuit to produce a leach solution comprising cuprous chloride, cupric chloride, ferrous chloride and soluble metal impurities, the solution further processed for copper recovery, the improvement by which elemental sulfur, copper and molybdenum in the tailings from the main leach are selectively separated and recovered which sequentially comprise the following:
   (a) removing elemental sulfur from the tailings;
   (b) recovering copper from the residue from the sulfur solvent leach of step (a) by leaching the sulfur depleted residue with ferric chloride to selectively solubilize copper; and
   (c) recovering molybdenum from the residue from the ferric chloride leach of step (b).

2. The process of claim 1 wherein the sulfur is removed by solubilizing the sulfur followed by recovering elemental sulfur from the solution.

3. The process of claim 1 wherein the sulfur is removed by means of volatilization.

4. The process of claim 1 in which the recovered solubilized copper is returned to the main leach circuit for recovery of elemental copper.

5. The process of claim 1 performed continuously with the main leach.

6. The process of claim 1 in which the tailings of step (a) contain gold and before step (c) the residue of step (b) is leached with cyanide to solubilize gold before the residue is sent to step (c) and gold recovered from the cyanide solution.

7. The process of claim 1 in which prior to step (a) the tailings are concentrated by froth flotation to reject impurities such as pyrite and jarosite.

8. In the process for recovering copper from copper sulfide concentrates in which the concentrate is leached in a main leach circuit to produce a leach solution comprising cuprous chloride, cupric chloride, ferrous chloride and soluble metal impurities, the solution further processed for copper recovery, the improvement by which elemental sulfur, copper and molybdenum in the tailings from the main leach are selectively separated and recovered which comprises the following:
   (a) removing elemental sulfur from the tailings by volatilizing the sulfur;
   (b) recovering copper from the residue from the sulfur volatilization of step (a) by leaching the sulfur depleted residue with ferric chloride to selectively solubilize copper; and
   (c) recovering molybdenum from the residue from the ferric chloride leach of step (b).

9. The process of claim 8 in which the recovered solubilized copper is returned to the main leach circuit for recovery of elemental copper.

10. The process of claim 8 performed continuously with the main leach.

11. The process of claim 8 in which in step (a) the sulfur is volatilized at temperatures between about 300° C. and 600° C.

12. The process of claim 8 in which in step (a) the sulfur is volatilized at temperatures between about 400° C. and 500° C.

13. The process of claim 8 in which in step (a) sulfur is volatilized under partial vacuum.

14. The process of claim 8 in which in step (a) sulfur is volatilized by heating for up to 15 minutes.

15. The process of claim 8 in which the tailings of step (a) contain gold and before step (c) the residue of step (b) is leached with cyanide to solubilize gold before the residue is sent to step (c) and gold recovered from the cyanide solution.

16. The process of claim 8 in which prior to step (a) the tailings are concentrated by froth flotation to reject impurities such as pyrite and jarosite.

17. In a hydrometallurgical process for recovering copper from copper sulfide ore concentrates in which the concentrate is leached in a main leach step with ferric chloride and/or cupric chloride to produce a leach slurry comprising cuprous chloride, cupric chloride and ferrous chloride in solution which latter is separated from the residue or tailings containing undissolved materials such as gold, molybdenite, elemental sulfur, some copper, and impurities, and the solution further processed to recover copper, the improvement by which the tailings are concentrated into a small bulk containing substantially all of the materials to be recovered and the elemental sulfur, gold, copper, and molybdenum in the concentrated tailings are selectively separated and recovered, comprising the following steps performed in the recited order:
   (a) concentrating said tailings by subjecting them to froth flotation to collect the elemental sulfur and copper, gold and molybdenum values in a float concentrate having a greatly reduced solids volume and to reject jarosite if present, and other impurities in a barren gangue;
   (b) performing a liquid-solids separation on said float concentrate;
   (c) recovering elemental sulfur from the float concentrate of step (b) by volatilizing the sulfur and recovering the sulfur from the vapor;
   (d) leaching the residue of step (c) with ferric chloride to selectively dissolve copper therein;
   (e) performing a liquid-solids separation on the slurry of step (d);
   (f) recycling the filtrate of step (e) to said main leach step for copper recovery;
   (g) leaching the residue of step (e) with cyanide to solubilize gold therein;
   (h) performing a liquid-solids separation on the slurry of step (g);
   (i) recovering gold from the solution of step (h);
   (j) subjecting the residue of step (h) to froth flotation and recovering the float concentrate containing molybdenum values, and elemental sulfur produced by the ferric chloride leach;
   (k) heating the float concentrate of step (j) to volatilize the elemental sulfur produced by the ferric chloride leach of step (d);
   (l) recovering sulfur from the vapor from step (k); and
   (m) recovering molybdenum from the residue of step (k).

18. The improved process of claim 17 in which the sulfur is volatilized at temperatures between about 400° and 500° C.

19. The improved process of claim 18 in which the sulfur is volatilized under partial vacuum.

20. The improved process of claim 19 in which the sulfur is volatilized by heating for up to 15 minutes.

21. A process for recovering copper, molybdenum and elemental sulfur from copper sulfide ore concentrates or tailings containing copper, molybdenum, elemental sulfur, pyrite and other impurities which comprises:
   (a) subjecting the concentrate or tailings to froth flotation to collect elemental sulfur, copper and molybdenum values in a float concentrate and reject the remainder of the tailings;
   (b) performing a liquid-solids separation on the float concentrate of step (a);
   (c) recovering sulfur from the float concentrate of step (b);
   (d) leaching the residue of step (c) with ferric chloride to selectively dissolve copper therein;
   (e) performing a liquid-solids separation on the slurry of step (d);
   (f) recovering copper from the filtrate of step (e); and
   (g) recovering molybdenum from the residue of step (e).

22. The process of claim 21 wherein the sulfur recovery of step (c) is accomplished by: leaching the residue of step (b) with a solvent for sulfur to dissolve elemental sulfur; a liquid-solids separation is performed on the slurry; and elemental sulfur is recovered from the filtrate.

23. The process of claim 22 in which the solvent for sulfur is ammonium sulfide.

24. The process of claim 23 in which elemental sulfur is recovered and ammonium sulfide is regenerated by evaporation of the filtrate.

25. The process of claim 21 wherein the sulfur recovery of step (c) is accomplished by volatilization of the sulfur at temperatures above the melting point of sulfur; and elemental sulfur is recovered from the vapor.

26. The process of claim 25 in which the sulfur is volatilized at temperatures between about 300° C. and 600° C.

27. The process of claim 21 in which in step (f) the copper is recovered from the ferric chloride leach solution by sending the solution to the leaching step of a hydrometallurgical circuit for the recovery of copper from its sulfide ores in which the ore is leached with ferric chloride and/or cupric chloride to produce a leach solution comprising cuprous chloride, cupric chloride and ferrous chloride.

28. The process of claim 21 in which the concentrate of step (a) contains gold and before step (g) the residue of step (e) is leached with cyanide to solubilize gold before the residue is sent to step (g) and gold recovered from the cyanide solution.

29. In the process for recovering copper from copper sulfide ore concentrates in which the concentrate is leached in a main leach step to produce a leach slurry comprising cuprous chloride, cupric chloride, and ferrous chloride in solution which latter is separated from the residue or tailings containing undissolved materials such as molybdenite, and elemental sulfur, some copper, and impurities and the solution further processed to recover copper, the improvement by which the elemental sulfur, copper and molybdenum in the tailings are selectively separated and recovered, comprising:
   (a) subjecting the tailings to froth flotation to collect the elemental sulfur, and copper and molybdenum values in a float concentrate and reject pyrite, jarosite, if present, and other impurities;
   (b) performing a liquid-solids separation on said float concentrate;
   (c) recovering sulfur from the float concentrate of step (b);
   (d) leaching the residue of step (c) with ferric chloride to selectively dissolve copper therein;
   (e) performing a liquid-solids separation on the slurry of step (d);
   (f) recovering copper from the filtrate of step (e);
   (g) subjecting the residue of step (e) to froth flotation and recovering the float concentrate containing elemental sulfur and molybdenum values;
   (h) recovering sulfur from the float concentrate of step (g);
   (i) recovering molybdenum from the residue of step (h).

30. The process of claim 29 wherein the sulfur recovery of step (c) is accomplished by leaching the residue of step (b) with a solvent for sulfur to dissolve elemental sulfur; a liquid-solids separation is performed on the slurry; and elemental sulfur is recovered from the filtrate.

31. The process of claim 30 in which the solvent for sulfur is ammonium sulfide.

32. The process of claim 31 in which elemental sulfur is recovered and ammonium sulfide is regenerated by evaporation of the filtrate.

33. The process of claim 29 wherein the sulfur recovery of step (c) is accomplished by volatilization of the sulfur at temperatures above the melting point of sulfur; and elemental sulfur is recovered from the vapor.

34. The process of claim 33 in which the sulfur is volatilized at temperatures between about 300° C. and 600° C.

35. The improved process of claim 29 in which in step (f) the copper is recovered from the ferric chloride leach solution by recycling the latter to said main leach for recovery of copper.

36. The improved process of claim 29 in which the concentrate of step (a) contains gold and before step (g) the residue of step (e) is leached with cyanide to solubilize gold before the residue is sent to step (g) and gold recovered from the cyanide solution.

37. The improved process of claim 32 in which in step (e) the filtrate is evaporated at a temperature of at least about 95° C.

38. The process of claim 33 wherein the sulfur is volatilized at temperatures between about 400° C. and 500° C.

39. The process of claim 33 wherein the sulfur is volatilized under partial vacuum.

40. The process of claim 33 wherein the sulfur is volatilized by heating for up to 15 minutes.

41. The improved process of claim 29 in which in step (d) the residue is ground to about 95 percent being about −325 mesh to expose interlocked copper sulfide ore before it is leached with ferric chloride.

UNITED STATES PATENT OFFICE
CERTIFICATE OF CORRECTION

Patent No. 4,236,918 Dated December 2, 1980

Inventor(s) Kartik A. Narain

It is certified that error appears in the above-identified patent and that said Letters Patent are hereby corrected as shown below:

On the title page under "Notice" where the date Feb. 6, 1995 appears, it should read -- Feb. 6, 1996 --.

Signed and Sealed this

Tenth Day of August 1982

[SEAL]

Attest:

Attesting Officer

GERALD J. MOSSINGHOFF

Commissioner of Patents and Trademarks